United States Patent [19]

Ekman

[11] Patent Number: 5,076,325
[45] Date of Patent: Dec. 31, 1991

[54] ARRANGEMENT FOR CONNECTABLE MALE AND FEMALE PARTS

[76] Inventor: Thure Ekman, Slalomvägen 12, 541 33, Skövde, Sweden

[21] Appl. No.: 517,850

[22] Filed: May 2, 1991

[30] Foreign Application Priority Data

May 2, 1989 [SE] Sweden .................. 8901583

[51] Int. Cl.$^5$ .............................. F16L 37/28
[52] U.S. Cl. .................. 137/614.03; 137/614.05
[58] Field of Search ................ 251/149.8; 137/614.03, 137/614.05

[56] References Cited

U.S. PATENT DOCUMENTS

| | | | |
|---|---|---|---|
| 3,039,794 | 6/1962 | DeCenzo | 137/614.03 |
| 4,124,228 | 11/1978 | Morrison | 137/614.03 X |
| 4,219,048 | 8/1980 | Ekman | 251/149.6 X |
| 4,287,914 | 9/1981 | Buseth et al. | 137/614.03 X |
| 4,289,164 | 9/1981 | Ekman | 137/614.03 |
| 4,674,535 | 6/1987 | de Menibus | 137/614.03 |
| 4,742,850 | 5/1988 | Ekman | 137/614.03 X |
| 4,774,983 | 10/1988 | Abe | 137/614.20 |
| 4,779,645 | 10/1988 | Ekman | 137/614.03 |
| 4,806,939 | 5/1978 | Wilcox et al. | 137/614.03 |
| 4,848,728 | 7/1989 | Ekman | 251/149.6 |
| 4,865,292 | 9/1989 | Ekman | 251/149.6 |
| 4,949,938 | 8/1990 | Ekman | 251/149.6 |

FOREIGN PATENT DOCUMENTS 1104697 2/1968 United Kingdom .
2068069 8/1981 United Kingdom .
2175968 12/1986 United Kingdom .
2186044 8/1987 United Kingdom .

OTHER PUBLICATIONS

European Search Report for Application No. 9009212.3.

Primary Examiner—John Rivell
Attorney, Agent, or Firm—Pollock, Vande Sande & Priddy

[57] ABSTRACT

Coupling arrangement comprising connectable male and female parts (1, 2). The male part can be partially inserted into the female part. The female part comprises a longitudinally displaceable inner sleeve (4) which, in the non-actuated position of the female part, is caused to assume a closed position. When the male part is inserted into the female part, the inner sleeve is acted upon counter to the action of a spring function towards an open position, in which the media passage through the coupling is open. At its section (18) which can be inserted into the female part, the male part is provided with an inner surface (18a) which, upon insertion of the male part into the female part, surrounds a corresponding outer surface (4d) on the inner sleeve. Sealing members (18b, 18c and 21) prevent media leakage during the coupling movement of the male and female parts. The inner sleeve is designed so as to execute, upon exposure to a media pressure, for example a media pressure in the male part, a longitudinal displacement movement towards its fully open position dependent on the media pressure and independently of the male part. The said sealing members effect their sealing function during the whole of the independent longitudinal displacement movement.

11 Claims, 2 Drawing Sheets

ARRANGEMENT FOR CONNECTABLE MALE AND FEMALE PARTS

TECHNICAL FIELD

The present invention relates to a coupling including connectable male and female coupling parts, for example those parts incorporated in a quick coupling. When the parts are coupled, the male part can be partially inserted into the female part. The female part comprises a longitudinally displaceable inner sleeve which, in the non-actuated position of the female part, is caused to assume a closed position, preferably by means of a spring. In the said closed position the media passage through the female part is shut off. When the male part is inserted into the female part, the said inner sleeve can be longitudinally displaced, counter to the action of a spring, towards an open position. In this open position the media passage is completely open. The male part is provided, at its section which can be inserted into the female part, on the one hand with an inner surface which, upon insertion of the male part into the female part, surrounds a corresponding outer surface of the inner sleeve and, on the other hand, with a lifting surface which, at a predetermined degree of insertion of the male part in the female part, is designed to cause a lifting action of the inner sleeve. Also included are sealing members which prevent media leakage during the coupling movement of the male and female coupling parts.

BACKGROUND OF THE INVENTION

It is previously known, for example, from U.S. Pat. No. 4,219,048, to design the female part with an inner sleeve which, when the male and female parts are connected, is surrounded by an inner wall in the male part at its front end. In this patent the purpose is to obtain, during coupling, a sealing function by means of a sealing member arranged in the inner wall. After a predetermined insertion distance, a lifting surface at the front section of the male part activates the inner sleeve which, by means of the pushing force in the male and female parts, is lifted out from its sealing position to open a media passage which extends in the female part, among other things, via the inside of the inner sleeve.

Couplings of this type must satisfy present day requirements for easily-effected coupling under various coupling conditions. Among other things, there should be a simple and smooth coupling function, even if the chamber of the male part conveying the media or containing the media is under excess pressure during the coupling movement of the coupling parts. Thus, for example, the coupling should take place, without any risk of media leakage during the coupling, when the media pressure in the male part assumes values of up to 40 MPa (400 bar).

This requirement should not mean that the coupling parts have to be of a complicated technical construction, the flow area in the coupling parts is reduced, and the like. A further requirement is that it must be possible for coupling and decoupling to be carried out with a very high degree of freedom from leakage.

SUMMARY OF THE INVENTION

The purpose of the present invention is to provide a device which overcomes, among other things, the problems. According to the above features of the present invention the inner sleeve, upon exposure to a media pressure, for example a media pressure in the male part, is designed to respond to the media pressure by executing a longitudinal displacement movement independent of the male part towards its fully open position, and the sealing members perform their sealing function during the whole of the independent longitudinal displacement movement.

In a preferred embodiment the said sealing members comprise a first sealing member which cooperates with the inner and outer surfaces of the male part and inner sleeve respectively, and a second sealing member arranged between a sealing part and an inner wall of the male part. The first sealing member can be arranged in a known manner in the inner wall of the male part (or alternatively in the outer surface of the inner sleeve), at the front end of the male part, while the second sealing member is arranged in a recess in the sealing part behind and in close connection to the first sealing member when the male part is in the non-actuated position or state.

The male part exerts an action on the inner sleeve by means of a lifting surface situated at the first sealing member, which lifting surface can, in a known manner, consist of the front surface of the male part. In a preferred embodiment the inner wall of the male part can be inserted over the outer surface of the inner sleeve with significant overlapping, which means that the inner sleeve can execute a relative longitudinal displacement movement relative to the inner wall of the male part while continuing the sealing function by means of the first seal when the second seal in the male part, as a result of the longitudinal displacement of the sealing part relative to the inner wall during the coupling movement between the male and female parts, begins to withdraw from its sealing function and a media pressure inside the male part therefore gains access to a surface/end surface of the inner sleeve and generates the relative longitudinal displacement movement before the final coupling position is reached between the male and female parts.

On account of the longitudinal displacement of the sealing part relative to the inner wall of the male part, when the sealing function of the second sealing member ceases, the media pressure also gains access to the end surface of the sealing part. In this respect an increased insertion force can arise at the sealing part. In one embodiment, a longitudinal-displacement-fixing member, for example in the form of a retaining ring, a shoulder on the sealing part of the male part, and the like, is used in a damping function for the sealing part of the male part. Upon the opening movement of the sealing part increased by the media pressure, the longitudinal-displacement-fixing member gains access to an annular chamber which is open towards the front and in which media is confined on account of the longitudinal-displacement-fixing member rising in the chamber. The confined or partially confined media can thus be used as damping media in the retardation of the sealing part. The inner sleeve is preferably designed with an annular, forward-directed chamber in which media can be confined by means of a formation situated on the inner sleeve. The confined media takes part in the retardation process of the inner sleeve with reference to the fully open position, towards which the inner sleeve moves due to the excess pressure in the male part or equivalent.

The male part is preferably designed with at least one overlapping distance by which the male part projects into the female part in order to permit passage, due to the second sealing member withdrawing from its sealing function, of a flow of media from the male part with simultaneous secure sealing between the inner wall of the male part and the outer surface of the inner sleeve. In one embodiment the first sealing can be replaced by or supplemented with a sealing on the outer surface of the inner sleeve surrounded by the insertion section of the male part.

The overlapping distance is chosen in such a way as to allow the inner sleeve a predetermined maximum movement distance, during which the inner sleeve is prevented from withdrawing from its sealing function with respect to the inner wall of the male part effected by the first sealing member. In one embodiment the overlapping distance is also chosen in such a way that it comprises at least the predetermined maximum movement distance and the design length of the first sealing member.

In a preferred embodiment the second sealing member is arranged in the sealing part of the male part and comprises a lip part which is facing or directed towards the inside of the male part. This lip part serves as a scraping part for media on the inner wall of the male part when the sealing part of the male part moves inwards during the coupling movement of the male and female parts. Upon decoupling, the lip part is designed by virtue of its position to spring aside and let out a media cushion confined between the sealings, which guarantees a reliable sealing function.

By means of the present invention distinct end and coupling positions are obtained for the coupling parts. Effective damping functions can come into operation in cases where excess pressure is present in the male part during coupling and gives rise to increased movement forces in the inner sleeve and the sealing part of the male part. An effective scraping function is obtained for preventing media confinement between cooperating sealing members. Coupling can take place with excess pressure in the male part. In addition, the coupling is carried out essentially free from leakage.

DESCRIPTION OF FIGURES

A preferred embodiment of a coupling device showing the characteristic features of to the invention will be described hereinbelow with reference to the attached drawings, in which.

PREFERRED EMBODIMENT

The basic design of the female part 1 is partly known from the U.S. Pat. No. 4,219,048. The basic design of the female part 2 is known from Swedish Patent 8700093-1. The parts will therefore be described only insofar as they are relevant to the invention.

Figure 1:
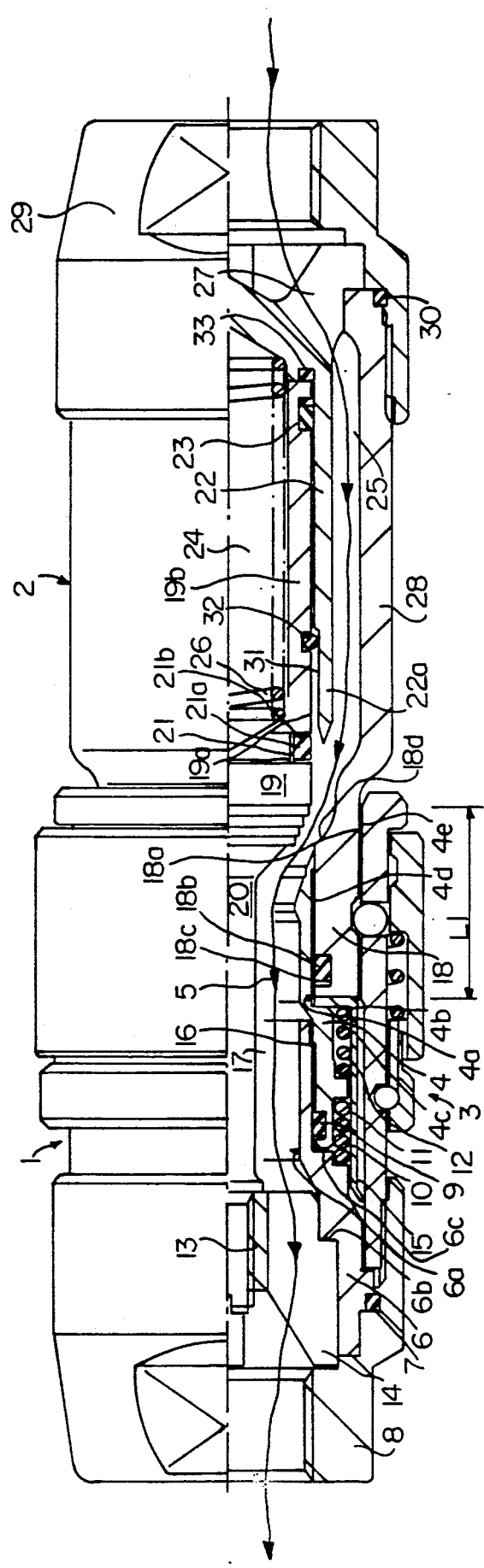
FIG. 1 shows, in a partial longitudinal section, the fully coupled position of the male and female parts in a quick coupling.

The male and female parts are included in a quick coupling and can be connected by means of known coupling members 3. An inner sleeve in the female coupling is indicated by 4. In FIG. 1 the inner sleeve is in its fully opened position, in which position a continuous passage, shown by arrows 5, is effected. The direction of flow can be such as indicated by the arrows 5, or it can assume the opposite direction, depending on the particular coupling case. The inner sleeve is mounted on a bearing part 6 which is sealed off by means of a seal 7 with respect to the frame or nut 8 of the male part.

The inner sleeve is sealed off with respect to the bearing part 6 by means of a seal 9. The actuation of the inner sleeve is effected counter to the action of a spring 10 which attempts to longitudinally displace the inner sleeve towards a closed position. In the female coupling part there is also an additional sleeve 11 which is arranged outside the inner sleeve and is mounted on the inner sleeve. Arranged between the sleeves is a spring 12 which acts on the additional sleeve 11 towards a closed position. The spring 10 is stronger than the spring 12. The bearing part 6 is mounted in a known manner in a spider 13 whose wings are indicated by 14. Parts of the inner wall 4a of the inner sleeve and parts of the inner wall 6a of the bearing part have essentially the same internal diameters. The bearing part 6 is designed with different internal diameters, and a rear shoulder 6b formed by a diameter difference is used to fix the longitudinal position of the wings of the spider. The bearing part is widest at the rear and gradually narrows towards the front. The inner sleeve is designed with different internal diameters, and its rear part is mounted on the front part of the bearing sleeve, at which a stop surface 6c is arranged and defines the fully open position of the inner sleeve. The stop surface is arranged immediately in front of a support surface for the spring 10. The inner sleeve is widest at the rear and gradually narrows towards the front. At the front part of the inner sleeve there is an inner flange-shaped section. The sleeve 11 is mounted in a chamber 15 outside the inner sleeve 4 and the bearing part 6. The inner sleeve has an actuation surface 4b via which the inner sleeve can be lifted. An outer surface 4d extends between the collar 4b and the front end 4e of the sleeve. Between the front part of the bearing part and a shoulder 4c on the inner sleeve, at its middle part, there is a chamber 16 in which media can be confined during coupling of the parts 1 and 2 according to what is stated below. That part of the continuous passage in the female part is indicated by 17.

The male part 2 is designed with a part 18 which can be inserted into the female part and which has an inner wall 18a. The latter is provided in a known manner with a first sealing member, preferably in the form of an O-ring seal 18b and a back-up seal 18c. A total insertion length or overlap distance for the insertion of the male part into the female part is indicated by L1. In the insertion position according to FIG. 1 the inner wall 18a surrounds the outer surface 4d of the inner sleeve 4.

The male part comprises in a known manner a sealing part 19 which, again in a known manner, is arranged end face to end face with a central body 20 during coupling of the parts 1 and 2, which body 20 is arranged fixed or longitudinally displaceable in the spider in the female part, and which is forced during coupling to execute a longitudinal displacement movement backwards on account of the body 20. The sealing part 19 supports in a recess 19a a second sealing member 21 with a square or rectangular cross-section and connected to this are lip seal parts 21a, 21b facing towards the inside of the male part. The sealing part 19 is mounted in a bearing part 22 and is sealed off in the latter by means of sealing member 23. The inner chamber 24 of the bearing part is thus sealed off with respect to the chamber 25 of the male part conveying the media or containing the media. The sealing part is acted upon to assume its fully open position shown in FIG. 1 counter to the action of an internal spring 26 arranged in the chamber 24.

The bearing part 22 is held in a central position in the chamber 25 by means of wing-shaped elements or corresponding elements 27. The male part also comprises a frame part consisting of a sleeve 28 supporting the insertion part 18 and a nut 29 or equivalent frame part arranged on the latter, in which respect the parts 28 and 29 are sealed off by means of a seal 30.

The bearing section 19b of the sealing part 19 in the bearing part 22 forms, together with the bearing part 22, at its front section 22a, an annular forward-facing chamber 31. The closed position of the sealing ring 19, 19b is defined by means of a retaining ring 32 which, in the closed position for the sealing part, can cooperate with an internal shoulder or internal seat 18d in the male part and which, in its fully opened position which is shown, has climbed the chamber 31 and, during the coupling movement of the parts 1 and 2, confines media in front of it, which confined media is used as a damping medium. The bearing part 22 also has an internal end-position seal (stop seal) 33, for example in the form of an elastic member.

Figure 2:
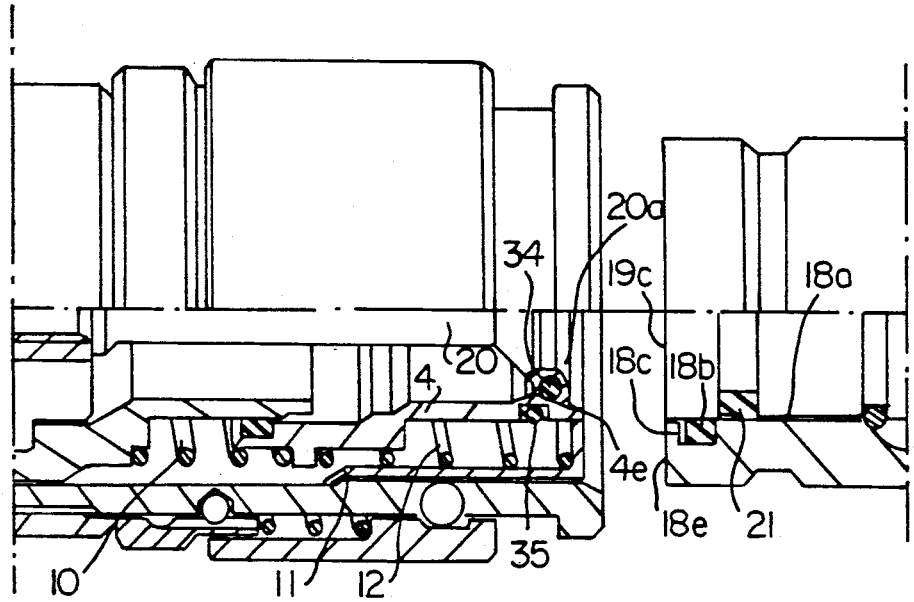
FIG. 2 shows, in a partial longitudinal section, the position of the fully decoupled female part and the front section of the male part.

FIG. 2 shows the closing positions of the inner sleeve 4 and the sleeve 11 produced by means of the springs 10 and 12. The front section of the sleeve is sealed off, via a tapered internal front surface, with respect to a widened part 20a in the body 20 of the female part. The widened part has a corresponding tapered external surface. Sealing is effected by means of a sealing member 34.

The widened part supports in a known manner a support surface for the inner sleeve 4 whose front end or edge 4e extends beyond the support surface.

The sealing members 18b, 18c and 21 effect the sealing function by cooperating with the inner wall 18a in the non-actuated position of the male part, see FIG. 2. In the sealing position the sealing member 21 is situated behind and in close connection to the sealing member 18b, 18c.

Figure 3:
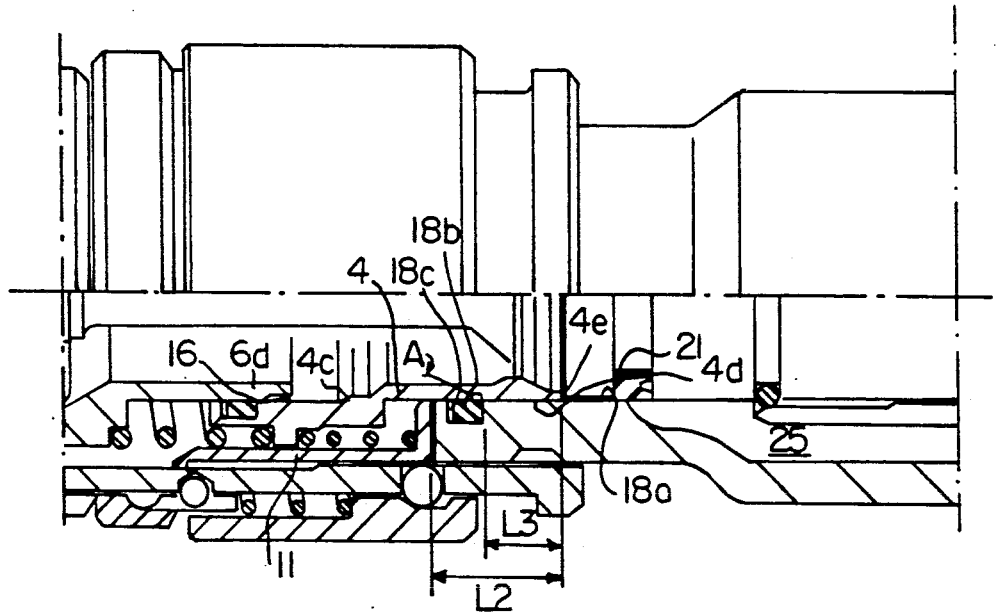
FIG. 3 shows, in a partial longitudinal section, an intermediate coupling position of the male and female parts.

In FIG. 3 the sealing member 18b, 18c is in cooperation with the outer wall 4d of the inner sleeve 4, while the sealing member 21 begins to withdraw from its cooperation with the inner wall 18a. Any excess pressure of media can then gain access, via the gap between the outer surface of the sealing part and inner wall 18a, to the annular edge surface at the front end 4e of the inner sleeve exposed in this position. Depending on the magnitude of the media pressure, the media pressure can exert via the edge surface an increased opening force on the inner sleeve. When the media pressure is high, the media pressure can take over the opening movement to the fully opened position of the inner sleeve from the male part, which in such a case is unable to enter into its lifting cooperation with the inner sleeve 4 via the sleeve 11. When the media pressure in the chamber 25 is low or is completely absent, the opening movement of the inner sleeve is effected partially or completely by means of the male part.

In FIG. 3 an overlap distance is indicated by L2. The male part extends into the female part by this overlap distance in order to permit passage of a flow of media from the male part, with a simultaneous secure sealing between the inner wall of the male part and the outer surface of the inner sleeve by means of the sealing member 18b, 18c. In addition, FIG. 3 shows a predetermined maximum movement distance L3, during which the inner sleeve is prevented from withdrawing from its sealing function. The inner sleeve can therefore move a distance L3 where the end surface 4e can assume a position A immediately in front of the sealing member 18b, 18c.

The supply of media to the end surface edge 4e of the inner sleeve can result in a quick acceleration movement in the inner sleeve. In order to dampen the movement at the end position of the inner sleeve, the chamber 16 formed by the parts 6d and 4c, in connection with the fully open position of the inner sleeve, is used as a damping chamber which operates with media successively confineable in the chamber, in which respect the chamber/the parts 6d/4c are designed to provide an appropriate retardation of the inner sleeve.

When the sealing member 21 withdraws from its sealing function according to FIG. 3, it is possible for excess pressure media in the male part to gain access to the end surface 19c of the sealing part 19 and also cause an acceleration movement in the sealing part 19. In this case the latter is retarded in a suitable manner by means of the longitudinal-position-fixing member 32 used as a damping member in the chamber 31, which member climbs the chamber and confines media in front of it. The media confined in the chambers 16 and 31 can only trickle out via small gaps, so that the desired damping function is obtained. For damping of the sealing part 19, the end-position damper 33 is also used as the stop damper in some cases.

By means of the specific design of the second sealing member in the form of the lip seal part 21b, confinement of media between the first and second sealing members can be prevented. The lip seal part is directed inwards towards the inside of the male part, which means that the free part of the inwardly directed lip seal part 21b can carry out diversion of the media when the sealing part moves towards its closed position and a scraping movement for media on the inner wall 18a when the sealing part 19 moves towards its opened position. The sealing member 18b, 18c can be replaced by or supplemented with a sealing member 35 in the outer surface of the inner sleeve. In this case the sealing member 21 can be replaced by a sealing member of simpler design, for example an O-ring.

The invention is not limited to the embodiments shown hereinabove by way of example, but instead can be subjected to modifications within the scope of the following patent claims and within the inventive concept.

An arrangement and a method for connecting the above male and female coupling parts 1, 2 are proposed through the invention, in which the male part, upon coupling of the parts, can be partially inserted into the female part. The female part comprises a longitudinally displaceable inner sleeve 4 which, in the non-actuated position of the female part, is acted upon to assume a closed position in which a media passage 17 through the female part is closed, and which, when the male part is inserted into the female part, is longitudinally displaceable by the male part counter to the action of a spring function towards an open position in which the media passage is open. The male part is provided at its section 18 which can be inserted into the female part with, on the one hand, an inner surface 18a which, upon insertion of the male part into the female part, surrounds a corresponding outer surface 4d of the inner sleeve and, on the other hand, with a lifting surface 18e which, at a predetermined degree of insertion, is designed to cause a lifting action of the inner sleeve, in which respect first and second sealing members 18b, 18c and 21 prevent media leakage during the coupling movement of the male and female coupling parts. The inner sleeve can be exposed to a media pressure which arises at a predetermined insertion position between the male and female parts via a communication/gap. The inner sleeve, when exposed to the media pressure, is capable of executing a longitudinal displacement movement towards it fully open position independently of the male part. The inner wall 18a of the male part can be inserted over the outer surface 4d of the inner sleeve with significant overlapping 11, which means that the inner sleeve is able to execute a relative longitudinal displacement movement 23 relative to the inner wall of the male part, while retaining the sealing function by means of the first sealing member 18b, 18c when the second sealing member 21 begins to withdraw from its sealing function and the inner sleeve is thus exposed to the media pressure and executes the relative longitudinal displacement movement before the final coupling position between the male and female parts is reached, in which respect the first sealing member effects its sealing function during the whole of the independent longitudinal displacement movement.

I claim:

1. A coupling device including:
    a male and a female coupling part being connectable to each other;
    an inner sleeve provided inside said female part and being longitudinally displaceable between an open and closed position;
    the male part at its one end portion being insertable inside said female part into a space formed between an inner wall surface of said female part and outer wall surface of said inner sleeve at a predetermined distance;
    spring means for acting upon said inner sleeve for assuming said closed position in a non-actuated position of said female part whereupon a media passage through said female part is closed;
    said inner sleeve being longitudinally displaceable in the direction opposite to the action of the spring means by said male part upon its insertion into said female part whereupon the media passage through said female part is open;
    said male part at said insertable end portion including an inner surface for surrounding a corresponding outer surface of said inner sleeve upon insertion of said male part into said female part, said male part further having a lifting portion for effecting lifting movement of said inner sleeve at a predetermined distance of insertion of said male part into said female part;
    said inner sleeve being adapted, upon its exposure to media pressure, for longitudinal displacement towards said open position independent of movement of said male part; and
    sealing means for preventing media leakage during the independent longitudinal displacement movement of said inner sleeve, said sealing means including a first sealing member positioned between said inner wall surface of said male part and said outer surface of said inner sleeve and a second sealing member arranged between a sealing part provided inside a space defined by said male part and said inner wall surface of said male part;
    wherein said predetermined distance at which said male part extends into said space between said female part and said inner sleeve is such that during said longitudinal displacement movement of said inner sleeve with respect to said inner wall of said male part, said first sealing member retains its sealing function after said second sealing member has been withdrawn from its sealing function during the coupling movement of said male and female parts.

2. A device according to claim 1, wherein said first sealing member is arranged in the inner wall of said male part at said end insertable inside said female part, and said second sealing member is arranged in a recess in said sealing part behind the first sealing member.

3. A device according to claim 1, wherein said lifting portion of said male part is situated at a location adjacent said first sealing member, and said male part is insertable into said space over the outer surface of the inner sleeve with great overlapping, such that the inner sleeve is adapted to execute said longitudinal displacement movement relative to the inner wall of said male part while retaining the sealing function by means of said first sealing member when the second sealing member in the male part, due to the longitudinal displacement of the sealing part relative to the inner wall of the male part during the coupling movement of the male and female parts, begins to withdraw from its sealing function and a media pressure inside said male part gains access to a surface on the inner sleeve and generates said relative longitudinal displacement movement before the final coupling position is reached between said male and female parts.

4. A device according to claim 2, wherein said lifting surface of said male part is situated at a location adjacent the first sealing member, and said male part is insertable into said space over the outer surface of the inner sleeve with great overlapping, such that the inner sleeve is adapted to execute said longitudinal displacement movement relative to the inner wall of said male part while retaining the sealing function by means of said first sealing member when the second sealing member in the male part, due to the longitudinal displacement of the sealing part relative to the inner wall of the male part during the coupling movement of the male and female parts, begins to withdraw from its sealing function and a media pressure inside said male part gains access to a surface on the inner sleeve and generates said relative longitudinal displacement movement before the final coupling position is reached between said male and female parts.

5. A device according to claim 1, wherein when the sealing function of the second sealing member ceases due to the longitudinal displacement of the sealing part with respect to the inner wall of the male part, the media pressure in the male part also gains access to a media-pressure-actuating surface on the sealing part and therefore causes an increased insertion force on the sealing part, wherein a longitudinal displacement-fixing member is provided on the sealing part of the male part, for defining the fully closed position of the sealing part, and wherein during the opening movement of the sealing part increased by the media pressure, said longitudinal-displacement-fixing member enters into an annular chamber which is open towards the front and in which media can be confined in order to serve as damping media upon retardation of the sealing part.

6. A device according to claim 5, wherein said longitudinal displacement-fixing member is in the form of a retaining ring.

7. A device according to claim 5, wherein said longitudinal displacement-fixing member is in the form of a shoulder.

8. A device according to claim 1, further including a bearing part for the inner sleeve which is designed together with the inner sleeve to provide an annular forward-facing chamber in which media is confined by means of the inner sleeve in order to take part in its retardation movement in connection with the fully open position when the inner sleeve, due to the media pressure in the male part, moves towards its fully open position.

9. A device according to claim 3, wherein said male part is designed with at least one overlapping distance by which said male part extends into said female part in order to permit passage, due to the withdrawal of the second sealing member from its sealing function, of a flow of media from the male part with simultaneous secure sealing between the inner walls of the male part.

10. A device according to claim 9, wherein said overlapping distance is selected in order to permit a predetermined maximum movement distance for the inner sleeve during which the inner sleeve is prevented from withdrawing from its sealing function with the inner wall of the male part effected by means of the first sealing member.

11. A device according to claim 9, wherein said overlapping distance is selected such that it comprises at least said predetermined maximum movement distance and the design length of the first sealing member.

* * * * *